(12) United States Patent
Patel et al.

(10) Patent No.: US 11,658,730 B2
(45) Date of Patent: *May 23, 2023

(54) SYSTEM AND METHOD FOR CONTROLLING TRANSMISSION POWER BY A NEXT GENERATION NEW RADIO REPEATER

(71) Applicant: Verizon Patent and Licensing Inc., Basking Ridge, NJ (US)

(72) Inventors: Samirkumar Patel, Middlesex, NJ (US); Andrew E. Youtz, Princeton, NJ (US); Paul R. Mcdonough, Marlboro, NJ (US); Shen-De Lin, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,960

(22) Filed: Dec. 6, 2021

(65) Prior Publication Data

US 2022/0094423 A1    Mar. 24, 2022

Related U.S. Application Data

(63) Continuation of application No. 16/662,257, filed on Oct. 24, 2019, now Pat. No. 11,228,360.

(51) Int. Cl.
*H04B 7/155* (2006.01)
*H04W 52/24* (2009.01)
(Continued)

(52) U.S. Cl.
CPC ..... *H04B 7/15507* (2013.01); *H04B 7/15535* (2013.01); *H04W 52/143* (2013.01);
(Continued)

(58) Field of Classification Search
CPC ............ H04B 7/15507; H04B 7/15535; H04B 7/15578; H04W 52/143; H04W 52/241;
(Continued)

(56) References Cited

U.S. PATENT DOCUMENTS

| 2007/0149137 A1* | 6/2007 | Richardson | ........... H04L 1/0004 455/68 |
| 2007/0149238 A1* | 6/2007 | Das | ........................ H04B 17/24 455/69 |

(Continued)

OTHER PUBLICATIONS

"3rd Generation Partnership Project; Technical Specification Group Radio Access Network; NR; Medium Access Control (MAC) protocol specification (Release 15)", 3GPP TS 38.321, Sep. 2019, 77 pages.

(Continued)

*Primary Examiner* — Mewale A Ambaye

(57) ABSTRACT

A method, device, and computer-readable medium provide for establishing, by a repeater device, a communication channel with a fixed wireless access (FWA) device; receiving, by the repeater device, reference signals from a wireless station; forwarding, by the repeater device, the reference signals to the FWA device; transmitting, by the repeater device, a first uplink signal from the FWA device using a first transmission power level to the wireless station, wherein the first transmission power level is a predetermined value; receiving, in response to the first uplink signal, transmit power control (TPC) command parameters from the FWA device via the communication channel; adjusting, by the repeater device and based on the first TPC command parameters, the first transmission power level from the predetermined value to an adjusted value; and transmitting, at the adjusted transmission power level, a second uplink signal from the FWA device to the wireless station.

20 Claims, 7 Drawing Sheets

(51) Int. Cl.
  *H04W 52/14* (2009.01)
  *H04W 52/28* (2009.01)
  *H04L 5/00* (2006.01)

(52) U.S. Cl.
  CPC ....... *H04W 52/241* (2013.01); *H04W 52/245* (2013.01); *H04W 52/283* (2013.01); *H04L 5/0048* (2013.01)

(58) Field of Classification Search
  CPC ............ H04W 52/245; H04W 52/283; H04W 84/047; H04L 5/0048
  See application file for complete search history.

(56) References Cited

U.S. PATENT DOCUMENTS

| | | | | |
|---|---|---|---|---|
| 2011/0177777 | A1* | 7/2011 | Kim | H04B 7/155 455/9 |
| 2015/0349874 | A1* | 12/2015 | Bhargava | H04L 5/0057 370/315 |
| 2017/0366328 | A1 | 12/2017 | Seo et al. | |
| 2018/0076876 | A1 | 3/2018 | Gerszberg et al. | |
| 2018/0262995 | A1* | 9/2018 | Akkarakaran | H04W 52/146 |
| 2019/0230297 | A1 | 7/2019 | Knorr et al. | |
| 2019/0230597 | A1* | 7/2019 | Akkarakaran | H04W 52/367 |
| 2019/0364562 | A1 | 11/2019 | Chae et al. | |
| 2021/0029654 | A1 | 1/2021 | Ryu et al. | |
| 2021/0119748 | A1* | 4/2021 | Damnjanovic | H04W 52/04 |
| 2021/0126701 | A1* | 4/2021 | Patel | H04W 52/245 |

OTHER PUBLICATIONS

"3rd Generation Partnership Project; Technical Specification Group Radio Access Network; NR; Multiplexing and channel coding (Release 15)", 3GPP TS 38.212, Sep. 2019, 98 pages.

"3rd Generation Partnership Project; Technical Specification Group Radio Access Network; NR; Physical layer procedures for control (Release 15)", 3GPP TS 38.213, Sep. 2019, 108 pages.

"3rd Generation Partnership Project; Technical Specification Group Radio Access Network; NR; Radio Resource Control (RRC) protocol specification (Release 15)", 3GPP TS 38.331, Sep. 2019, 526 pages.

* cited by examiner

SYSTEM AND METHOD FOR CONTROLLING TRANSMISSION POWER BY A NEXT GENERATION NEW RADIO REPEATER

RELATED APPLICATION

The patent application is a continuation of U.S. patent application Ser. No. 16/662,257 filed on Oct. 24, 2019, titled "SYSTEM AND METHOD FOR ADJUSTING A TRANSMISSION POWER LEVEL OF A NEXT GENERATION NEW RADIO REPEATER" (as amended), the disclosure of which is hereby incorporated by reference herein in its entirety.

BACKGROUND INFORMATION

To satisfy the needs and demands of wireless communication users, service providers continue to enhance and expand the services offered as well as the networks delivering such services. One such enhancement includes the development of Next Generation wireless systems designed to operate in the higher frequency ranges. Such systems are expected to transmit and receive in the GHz band, also known as the millimeter (mm) wave spectrum, with a broad bandwidth near 500-1,000 MHz. The bandwidth of Next Generation wireless systems is expected to support download speeds of up to about 35-50 Gigabits per second. Next Generation wireless systems, such as Fifth Generation (5G) systems, are expected to enable a higher utilization capacity than current wireless systems, permitting a greater density of wireless users, at a lower latency.

DETAILED DESCRIPTION OF PREFERRED EMBODIMENTS

Figure 1:
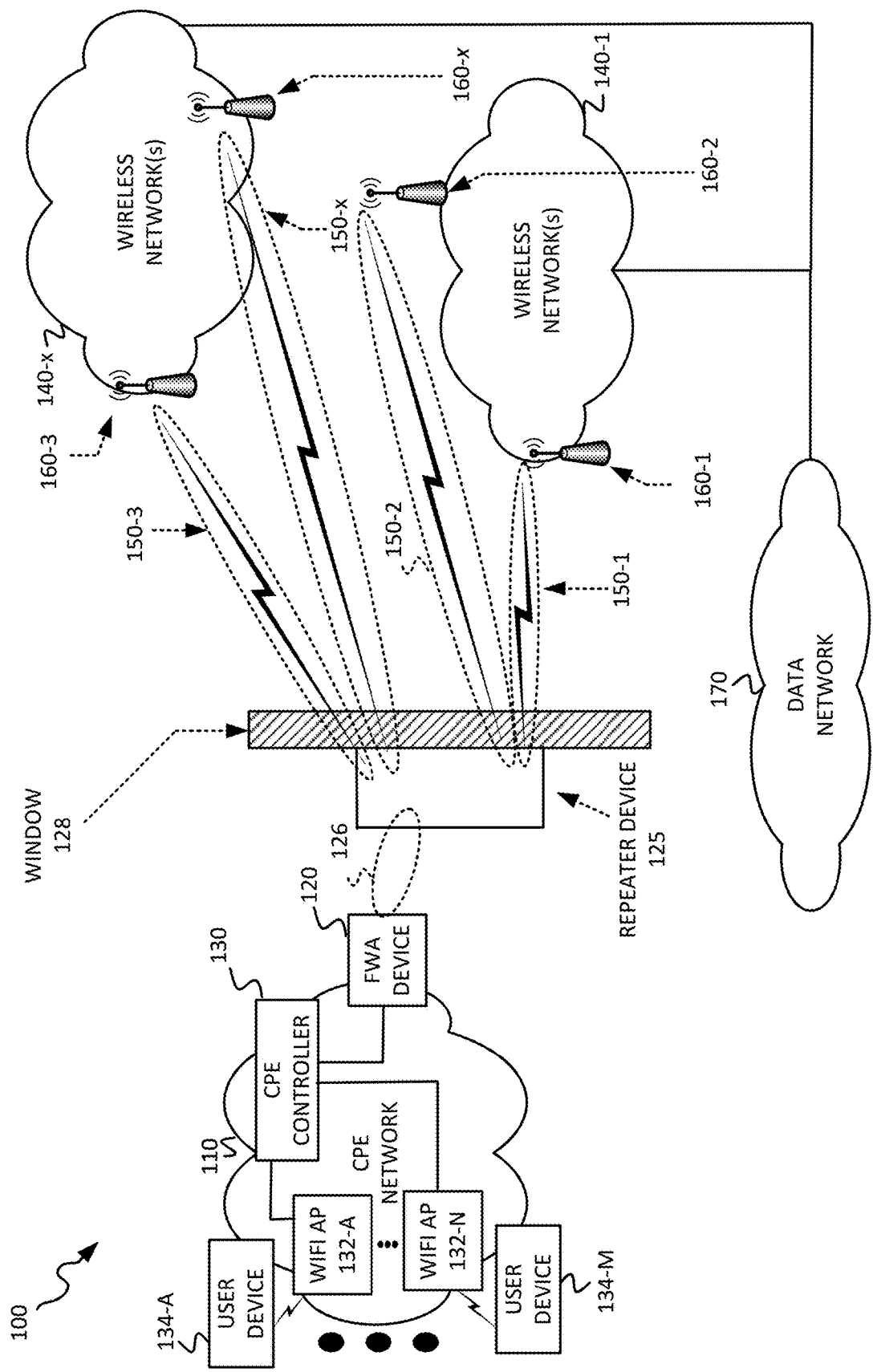
FIG. 1 is a diagram illustrating an environment according to an implementation described herein.

The following detailed description refers to the accompanying drawings. The same reference numbers in different drawings identify the same or similar elements. The following detailed description does not limit the invention, which is defined by the claims.

As communication networks and services increase in size, complexity, and number of users, management of the communication networks has become more complex. One way in which wireless access networks are continuing to become more complicated is by incorporating various aspects of advanced wireless systems, such as Fifth Generation (5G) service networks, utilizing high frequency bands, and/or lower frequency bands such as Sub 6 GHz, and a large number of antennas. 5G New Radio (NR) millimeter (mm) wave technology may provide significant improvements in bandwidth and/or latency over other wireless network technology.

The 5G NR mm-wave air interface may provide a high data throughput in comparison to the data throughput of a 4G Long Term Evolution (LTE) air interface. To take advantage of the high bandwidths available via the 5G NR air interface, a provider of communication services may deploy stationary or fixed wireless access (FWA) devices to provide telecommunication services, such as Internet service that includes Voice over Internet Protocol (VoIP), video streaming, live gaming, Internet browsing, etc. Thus, instead of a wired electrical connection (e.g., a coaxial cable connection, etc.) or an optical connection (e.g., an optical network terminal (ONT) to an optical fiber, etc.), an FWA device may connect a customer to a service network through one or more wireless stations (or access units) via over-the-air (OTA) signals. The FWA device may function as a UE device with respect to the wireless stations. Thus, an FWA device may be installed in a fixed location at the customer premises, such as a residence, an apartment building, an office building, etc.

However, because of the high mm-wave frequencies, the 5G NR signals may be susceptible to intermittent, degradations due to multipath wave propagation and fading, as a result of building penetration losses; scattering from terrain objects, such as buildings, foliage, landscaping, vehicles, signage, etc.; reflection from bodies of water; ionospheric reflection and/or refraction; atmospheric attenuation and scattering; and/or other types of signal interference. For example, modern glass (e.g., windows, doors, etc.) in buildings often have metallic type coatings to aid in thermal transfer characteristics (i.e., to reflect infrared radiation but let light through). These same coatings may significantly attenuate 5G radio frequency (RF) signals, thereby, limiting the reach of 5G cell sites within such buildings.

Such variations in signal quality may be particularly important in areas with a low density of 5G coverage, such as an area with the initial deployment of 5G wireless stations. Thus, many locations in a cell serviced by a 5G NR wireless station, such as a customer premises location where an FWA device is to be installed, may not receive 5G NR signals of sufficient strength or quality to satisfy a service requirement. In current wireless systems, the typical distance between adjacent base stations (e.g., eNodeB or eNB) is about 1.5-3.2 km. In contrast, for advanced wireless systems, such as 5G systems, the distance between adjacent base stations (e.g., gNodeB or gNB) may need to be reduced to about 200-1000 m. Therefore, next generation wireless systems may need as many as one hundred times the number of wireless stations as compared to current wireless systems.

The signal strength at an FWA device at a particular location may be increased through the placement of a radio frequency (RF) repeater device between the FWA device and the 5G NR wireless station. An RF repeater device may extend the range of transmitted wireless signals. The RF repeater device may receive wireless signals from a wireless station, amplify the received wireless signals, and re-broadcast the amplified wireless signals toward the FWA device. Similarly, the RF repeater device may receive wireless signals from the FWA device, amplify the received wireless signals, and re-broadcast the amplified wireless signals toward the wireless station.

An RF repeater device may not be enabled to control downlink and/or uplink transmission power levels for enabling communication between an FWA UE device and each of a number of 5G wireless stations. That is, an RF repeater device may not support closed loop NR uplink power control with the wireless station. As such, the RF repeater device may not be able to determine which RF signals are received from a nearby 5G wireless station (e.g., about 20-30 m), and which RF signals are received at the edge of a cell serviced by a 5G wireless station (e.g., about 100-500 m). As a result, for example, the RF repeater device may use a default transmission power level that may be set at a maximum amplified gain value for all uplink transmissions, such that the over-amplified uplink signals transmitted to a nearby 5G wireless station may cause the 5G wireless station to experience a signal-to-interference-plus-noise ratio (SINR) degradation for less powerful uplink signals received from other mobile UE and/or CPE UE located at the cell's edge. If such conditions persist system wide, the 5G uplink system coverage may not be extended but reduced.

Implementations described herein relate to an RF repeater device. An RF repeater device may include logic to dynamically control its uplink transmission power levels for signals sent to 5G NR wireless stations. In one embodiment, the RF repeater device may be configured to use information regarding the power associated with downlink signals received from a 5G wireless station to select a particular uplink transmission power level for the 5G wireless station. In another embodiment, the RF repeater device may be configured to use transmit power control (TPC) command parameters received from an FWA UE to select a particular uplink transmission power level for the 5G wireless station.

When first powered up, the RF repeater device may enter a power-up state and check to see if an FWA device, with which the repeater device has been paired, has entered a powered-on state. The RF repeater device and the FWA device may be paired through a short-range wireless communication connection, such as a WiFi or Bluetooth® connection. During the pairing, the RF repeater device may receive an identifier associated with the FWA device via the short-range wireless communication connection. If the FWA device is in the powered-on state, the RF repeater device may enter an acquisition state in which the RF repeater device may receive a reference signal (e.g., a synchronization signal block (SSB)) transmitted from one or more 5G NR wireless stations.

Thus, the RF repeater device may be configured to establish a communication channel with an FWA device associated with a CPE network, scan for 5G NR reference signals from a wireless station associated with a cell, receive TPC command parameters for the wireless station from the FWA device via the communication channel, and transmit signals from the FWA device to the wireless station at a transmission power level corresponding to the TPC command parameters. The RF repeater device may store the TPC command parameters as a transmission power level profile for the wireless station for subsequent transmissions to the wireless station.

The TPC command parameters may be determined, by a serving wireless station based on, for example, a Reference Signal Received Power (RSRP) value, a Reference Signal Received Quality (RSRQ) value, a Received Signal Strength Indication (RSSI) value, a signal-to-interference-plus-noise ratio (SINR) value, a signal to noise ratio (SNR) value, a block error rate (BLER) value, an amplifier gain setting value, a channel state information (CSI) report (including, e.g., Channel Quality Indicator (CQI), Precoding Matrix Indicator (PMI), Rank Indicator (RI), etc.), and/or another type of signal characteristic value. The FWA device may parse the TPC command parameters from the serving wireless station and forward TPC command parameters to the RF repeater device. The RF repeater device may adjust its transmission power/gain for uplink signals to the serving wireless station while satisfying any service threshold requirements.

In some embodiments, the adjusted transmission power levels for uplink signals may approximately correspond to a relative distance and/or a path loss between respective RF repeater devices and serving wireless stations. For example, an RF repeater device that is located proximate to serving wireless station and experiences lower path loss may use a lower transmission power level for uplink signals than an RF repeater device that is located relatively far from the serving wireless station (e.g., near the cell edge) and experiences higher path loss. In this way, overload conditions may be avoided at the serving wireless station (e.g., gNB).

The RF repeater device may be mounted on and/or near structural interfaces (e.g., windows, walls, glass doors, roofs, etc.). The RF repeater device may include an outdoor unit that attaches to an exterior surface of a structure, for example, where RF signals are measured or calculated to be powerful enough to penetrate the exterior. Additionally or alternatively, the RF repeater device may include an indoor unit that attaches to an interior surface of the structure, for example, where RF signals are measured or calculated to be powerful enough to penetrate the exterior but too weak when received at CPE UE. The RF repeater device may include an antenna, such as, for example, a phased array antenna, that transmits RF signals to, and receives RF signals from, other nodes in the wireless network (e.g., wireless stations or an FWA UE device, etc.).

When implemented at or near a structural interface within a geographic area, the RF repeater device extends the range of 5G cell sites within a wireless network. The RF repeater device, thus, may improve signal strength, SINR, and/or throughput within the wireless network while avoiding overload conditions at the serving 5G wireless station. Additionally, when extending the range of 5G cell sites, the RF repeater device can increase cell spacing, thereby reducing the amount of needed cell site infrastructure (e.g., fewer wireless stations) within a given region.

FIG. 1 is a diagram of an exemplary environment 100 in which the systems and/or methods, described herein, may be implemented. As shown in FIG. 1, environment 100 may include a customer premises equipment (CPE) network 110, a repeater device 125, a wireless network 140, and a data network 170.

CPE network 110 may include a local area network (LAN) associated with a customer's premises. For example, CPE network 110 may be located at or within a customer's residence, in an apartment building, in a school, in a commercial office building, in a shopping mall, in a connected mass transit vehicle (e.g., bus, train, plane, boat, etc.), and/or in another type of location associated with a customer of a provider of telecommunication services. CPE network 110 may receive services via a wireless connection between an FWA device 120 and a data network 170, such as, for example, a television service, Internet service, and/or voice communication (e.g., telephone) service. CPE network 110 may be implemented as a gigabit network that enables gigabit speed connections. CPE network 110 may include FWA device 120, a CPE controller 130, WiFi access points (APs) 132-A to 132-N (referred to herein collectively as "WiFi APs 132" and individually as "WiFi AP 132"), and user devices 134-A to 134-M (referred to herein collectively as "user devices 134" and individually as "user device 134").

FWA device 120 may be installed in a particular location at, or near, the customer premises, such as a building's exterior (e.g., on a roof, attached to an outside wall, attached to a window 128, etc.) or a building's interior (e.g., next to window 128 or at another location associated with good wireless signal reception). FWA device 120 may be configured to attach to, and communicate with, wireless network 140 and may be perceived as a user equipment (UE) device by wireless network 140. FWA device 120 may be configured to communicate via any type of air interfaces or a combination of air interfaces, such as e.g., both a 4G LTE air interface and a 5G NR air interface.

CPE controller 130 may include a network device configured to function as a type of switch and/or router for devices in CPE network 110. CPE controller 130 may connect devices in CPE network 110 to FWA device 120. CPE controller 130 may include a layer 2 and/or layer 3 network device, such as a switch, router, firewall, and/or gateway and may support different types of interfaces, such as an Ethernet interface, a WiFi interface, a Multimedia over Coaxial Alliance (MoCa) interface, and/or other types of interfaces. CPE controller 130 may further manage WiFi APs 132 and/or user devices 134 connected to WiFi APs 132.

WiFi AP 132 may include a transceiver configured to communicate with user devices 134 using WiFi signals, such as those based on the Institute of Electrical and Electronics Engineers (IEEE) 802.11 standards for implementing a wireless LAN network. WiFi AP 132 may enable user devices 134 to communicate with each other and/or with FWA device 120 via CPE controller 130. WiFi AP 132 may be connected to CPE controller 130 via a wired connection (e.g., an Ethernet cable). Furthermore, WiFi APs 132 may include one or more Ethernet ports for connecting user devices 134 via a wired Ethernet connection. In some implementations, FWA device 120 may include, and/or perform the functions of, CPE controller 130 and/or WiFi AP 132.

User device 134 may include any computer device that connects to a particular WiFi AP 132 using WiFi wireless signals. For example, user device 134 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a desktop computer; a set-top box or a digital media player (e.g., Apple TV, Google Chromecast, Amazon Fire TV, etc.); a smart television; a portable gaming system; a home appliance device; a home monitoring device; and/or any other type of computer device with wireless communication capabilities. User device 134 may be used for voice communication, mobile broadband services (e.g., video streaming, real-time gaming, premium Internet access etc.), best effort data traffic, and/or other types of applications. As another example, user device 134 may correspond to an embedded wireless device that communicates wirelessly with other devices over a machine-to-machine (M2M) interface using machine-type communication (MTC) and/or another type of M2M communication.

Wireless network 140 may provide access to data network 170 for wireless devices, such as FWA device 120. Wireless network 140 may enable FWA device 120 to connect to data network 170 for mobile telephone service, Short Message Service (SMS) message service, Multimedia Message Service (MMS) message service, Internet access, cloud computing, and/or other types of data services.

Wireless network 140 may establish or may be incorporated into a packet data network connection between FWA device 120 and data network 170 via one or more Access Point Names (APNs). If wireless network 140 includes a 5G SA architecture that implements network slicing, wireless network 140 may establish a packet data network connection between FWA 120 and a particular network data network via a Data Network Name (DNN). Thus, wireless network 140 may establish an Internet Protocol (IP) connection between FWA device 120 and data network 170 or another network reachable via data network 170. Furthermore, wireless network 140 may enable FWA device 120 to communicate with an application server, and/or another type of device, located in data network 170 using a communication method that does not require the establishment of an IP connection between FWA device 120 and data network 170, such as, for example, Data over Non-Access Stratum (DoNAS).

In some implementations, wireless network 140 may include an LTE access network (e.g., an evolved packet core (EPC) network). In other implementations, wireless network 140 may include a Code Division Multiple Access (CDMA) access network. For example, the CDMA access network may include a CDMA enhanced High Rate Packet Data (eHRPD) network (which may provide access to an LTE access network).

Furthermore, wireless network 140 may include an LTE Advanced (LTE-A) access network and/or a 5G access network or other advanced network that includes functionality such as carrier aggregation; higher-order modulation schemes, such as 256 quadrature amplitude modulation (QAM), 1024-QAM, etc.; advanced or massive multiple-input and multiple-output (MIMO) configurations (e.g., a 4×4 antenna configuration, an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as cat-egory Cat-M1), Low Power Wide Area (LPWA) technology such as Narrow Band (NB) IoT (NB-IoT) technology, and/or other types of MTC technology; and/or other types of LTE-A and/or 5G functionality.

Wireless network 140 may include LTE EPC network elements, such as a Mobility Management Entity (MME), a Serving Gateway (SGW), a Packet Data Network Gateway (PGW), a Home Subscriber Server (HSS), a Policy and Charging Rules Function (PCRF), and/or other EPC network elements. In other implementations, wireless network 140 may include a 5G Standalone (SA) architecture that includes 5G network functions such as an Access and Mobility Function (AMF), a User Plane Function (UPF), a Session Management Function (SMF), an Application Function (AF), a Unified Data Management (UDM), a Policy Control Function (PCF), a Network Repository Function (NRF), a Network Exposure Function (NEF), a Network Slice Selection Function (NSSF), and/or other 5G SA network elements. Furthermore, the 5G SA network may be configured to implement network slicing.

5G NR coverage may initially be deployed as islands relative to existing air interface coverage. Thus, areas with 5G NR coverage may also provide existing 4G LTE coverage, and UE devices enabled to communicate using 5G NR may be able to attach to both a 4G wireless station and a 5G wireless station. A UE device may be simultaneously attached to a master cell group (MCG), also known as a master eNodeB, and a secondary cell group (SCG), also known as a secondary eNodeB. If 5G NR coverage is available, the SCG may correspond to a 5G NR wireless station, referred to as a gNodeB. Dual coverage using 4G and 5G networks may be referred to as Non-Standalone (NSA) architecture.

Thus, as described herein, wireless network 140 may include a 4G wireless station (e.g., an eNodeB (not shown)) and a 5G wireless station 160 (e.g., a gNodeB). The 4G wireless station and 5G wireless station 160 may each include one or more RF transceivers that include devices and/or components configured to enable wireless communication with FWA devices 120. The 4G wireless station may be configured to communicate with FWA device 120 using a 4G LTE air interface. 5G wireless station 160 may be configured to communicate with FWA device 120 using a 5G NR air interface, such as, for example, a service area or cell 150-1 to 150-x (referred to herein collectively as "cells 150" and individually as "cell 150"). For example, 5G wireless station 160 may include one or more antenna arrays configured to send and receive wireless signals in the mm-wave frequency range via cells 150.

FWA device 120 may communicate with 5G wireless station 160 via repeater device 125. Repeater device 125 may receive 5G NR signals from 5G wireless station 160, amplify the received 5G NR signals, and transmit the amplified signals toward FWA device 120. Similarly, repeater device 125 may receive 5G NR signals from FWA device 120, amplify the received 5G NR signals, and transmit the amplified signals toward 5G wireless station 160. FWA device 120 may implement an algorithm or logic that calculates optimum uplink (UL) transmission power levels based on, for example, TPC command parameters received from FWA device 120 or a UL transmission power profile for 5G wireless station 160 retrieved from storage. Repeater device 125 and FWA device 120 may be paired through a short-range wireless communication connection 126, such as a WiFi or Bluetooth® connection.

Data network 170 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of data network 170 may be managed by a provider of communication services that also manages wireless access network 140, FWA device 120, and/or repeater device 125. Data network 170 may allow the delivery of Internet Protocol (IP) services to FWA device 120 and may interface with other external networks. Data network 170 may include one or more server devices and/or network devices, or other types of computation or communication devices. In some implementations, data network 170 may include an IP Multimedia Sub-system (IMS) network (not shown in FIG. 1). An IMS network may include a network for delivering IP multimedia services and may provide media flows between FWA device 120 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally, or alternatively, one or more components of environment 100 may perform functions described as being performed by one or more other components of environment 100.

Figure 2:
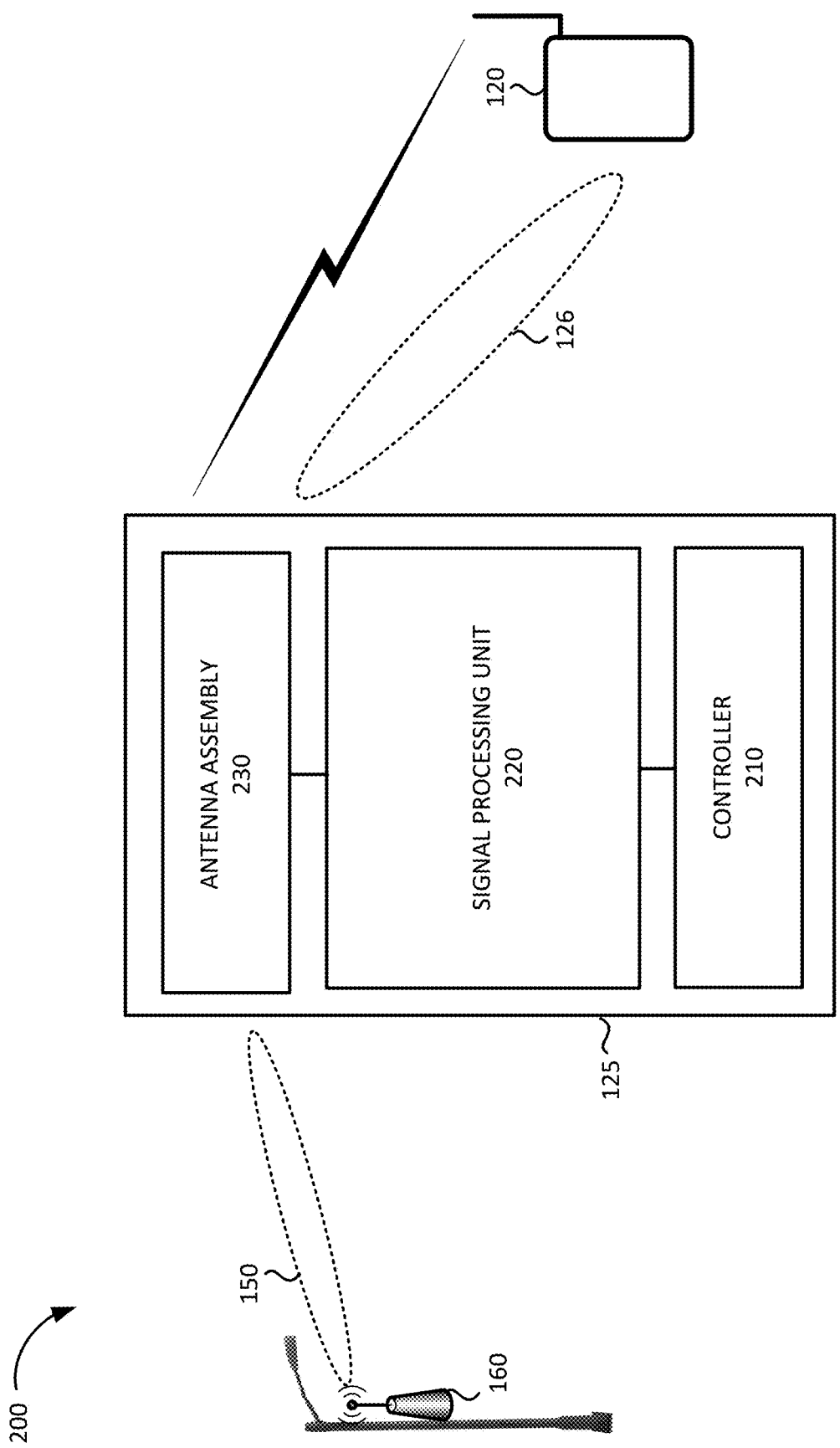
FIG. 2 is a diagram illustrating an exemplary system that includes the repeater device of FIG. 1 according to an implementation described herein.

FIG. 2 is a diagram illustrating an exemplary system 200 that includes repeater device 125. As shown in FIG. 2, system 200 may include 5G station 160, repeater device 125, and FWA device 120. Repeater device 125 may include a controller 210, a signal processing unit 220, and an antenna assembly 230. Controller 210 may control the operation of repeater device 125. Exemplary components of controller 210 are described below with reference to FIG. 4. Signal processing unit 220 may include elements to amplify signals received from 5G wireless station 160 before transmitting the signals toward FWA device 120. Additionally or alternatively, signal processing unit 220 may include elements to amplify signals received from FWA device 120 before transmitting the signals toward 5G wireless station 160.

Antenna assembly 230 may include an array of controllable antenna elements configured to send and receive wireless signals, such as 5G NR signals. Antenna array 230 may also enable controller 210 to communicate with FWA device 120 using LTE, for example, or a short-range wireless communication signals, via connection 126 such as a WiFi or Bluetooth connection to pair repeater device 125 with FWA device 120.

Although FIG. 2 shows exemplary components of system 200, in other implementations, system 200 may include fewer components, different components, differently arranged components, or additional functional components than depicted in FIG. 2.

Figure 3:
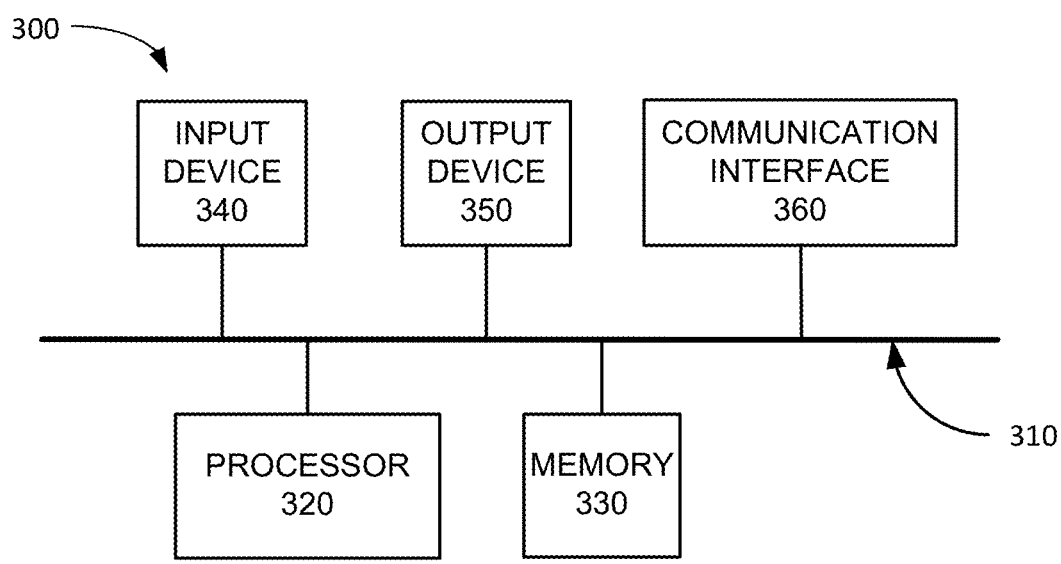
FIG. 3 is a diagram illustrating exemplary components of a device that may be included in a component of FIG. 1 according to an implementation described herein.

FIG. 3 is a diagram illustrating example components of a device 300 according to an implementation described herein. FWA device 120, repeater device 125, CPE controller 130, WiFi AP 132, user device 134, and/or 5G wireless station 160 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, output device 350 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to a 5G repeater configured to dynamically control uplink transmission power. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
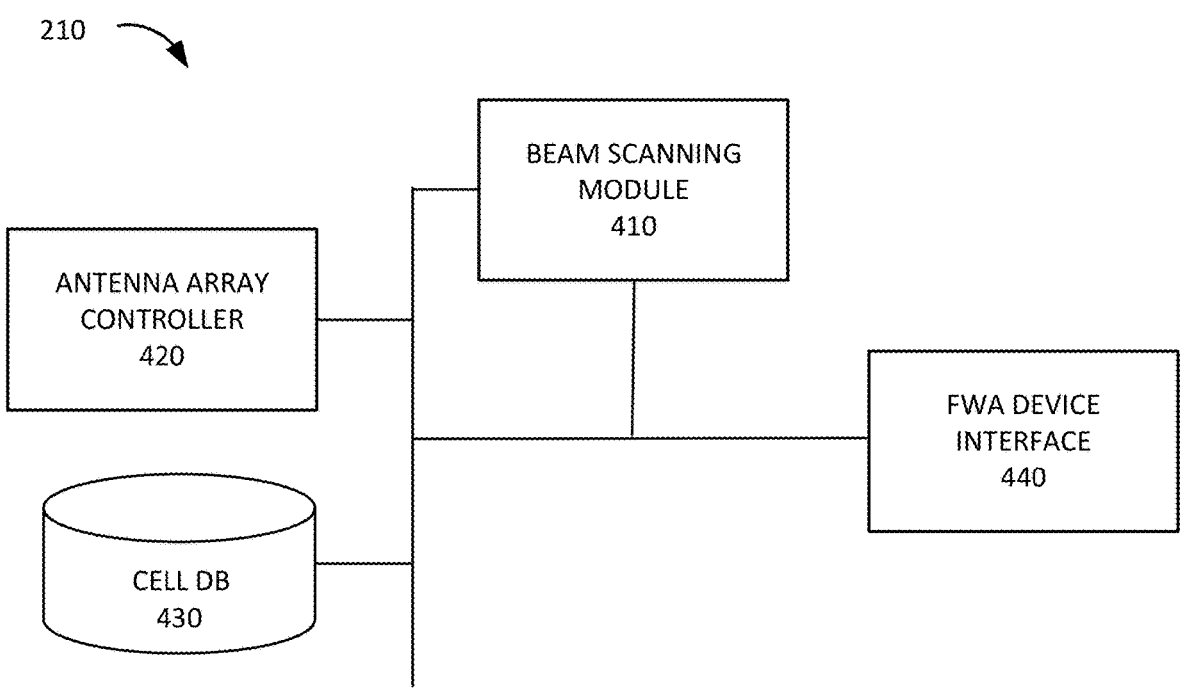
FIG. 4 is a diagram illustrating exemplary components of the controller of FIG. 2 according to an implementation described herein.

FIG. 4 is a diagram illustrating exemplary functional components of controller 210. The components of controller 210 may be implemented, for example, via processor 320 executing instructions from memory 330. Alternatively, some or all of the functional components of controller 210 may be implemented via hard-wired circuitry. As shown in FIG. 4, controller 210 may include a beam scanning module 410, an antenna array controller 420, a cell DB 430, and an FWA device interface 440.

Beam scanning module 410 may scan for antenna signals, such as reference signals (e.g., synchronization signal block) generated by 5G wireless station 160 and present in cell 150. Antenna array controller 420 may adjust the phase and/or amplitude of particular antenna elements in a particular sequence to generate uplink signals at an identified transmission power level or range based on the antenna setting corresponding to 5G wireless station 160. Beam scanning module 410 may store information relating to identified uplink transmission power profiles associated with 5G wires station 160, in cell DB 430. Exemplary information that may be stored in cell DB 430 is described below with reference to FIG. 5.

FWA device interface 440 may be configured to communicate with FWA device 120. For example, FWA device interface 440 may receive, from FWA device 120, TPC command parameters indicating an uplink transmission increase or reduction level associated with a cell 150 and an associated 5G network station 160. FWA device interface 440 receives the TPC command parameters via connection 126.

Although FIG. 4 shows exemplary components of controller 210, in other implementations, controller 210 may include fewer components, different components, differently arranged components, or additional components than depicted in FIG. 4. Additionally, or alternatively, one or more components of controller 210 may perform functions described as being performed by one or more other components of controller 210.

Figure 5:
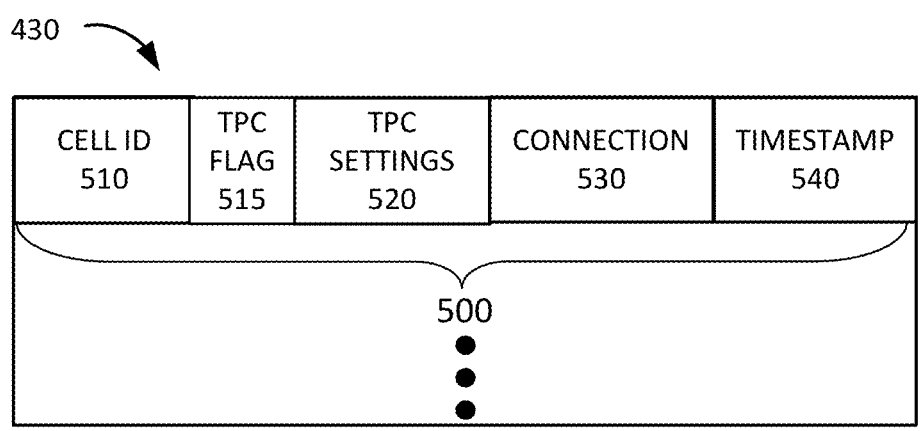
FIG. 5 is a diagram illustrating exemplary components of the cell database of FIG. 4 according to an implementation described herein.

FIG. 5 is a diagram illustrating exemplary information stored in cell DB 430 according to an implementation described herein. As shown in FIG. 5, cell DB 430 may include one or more cell records 500. Each cell record 500 may store TPC information relating to a corresponding 5G wireless station 160 identified by beam scanning module 410. Cell record 500 may include a cell identifier (ID) field 510, a TPC flag field 515, a TPC settings field 520, a connection field 530, and a timestamp field 540.

Cell ID field 510 may store an ID assigned by beam scanning module 410 to a particular cell 150 based on signals generated by 5G wireless station 160 and identified by analyzing a reference signal received within cell 150. TPC flag field 515 may be set to "0" if no TPC settings are stored for the identified cell 150 or set to "1" if TPC settings are stored for the identified cell 150 in TPC settings 520. TPC settings field 520 may store information identifying uplink transmission power settings for antenna array 230 associated with the particular cell 150. For example, TPC settings 520 may include transmission power level and/or range values, such as an amplifier gain setting value. Connection field 530 may store information identifying whether FWA device 120 previously connected to 5G wireless station 160 via the particular cell 150. Timestamp field 540 may contain a timestamp indicating a time of a connection identified in connection 530, in which TPC settings were initially determined and/or updated for uplink transmissions to cell 150.

Although FIG. 5 shows exemplary components of cell DB 430, in other implementations, cell DB 430 may include fewer components, different components, additional components, or differently arranged components than depicted in FIG. 5.

Figure 6:
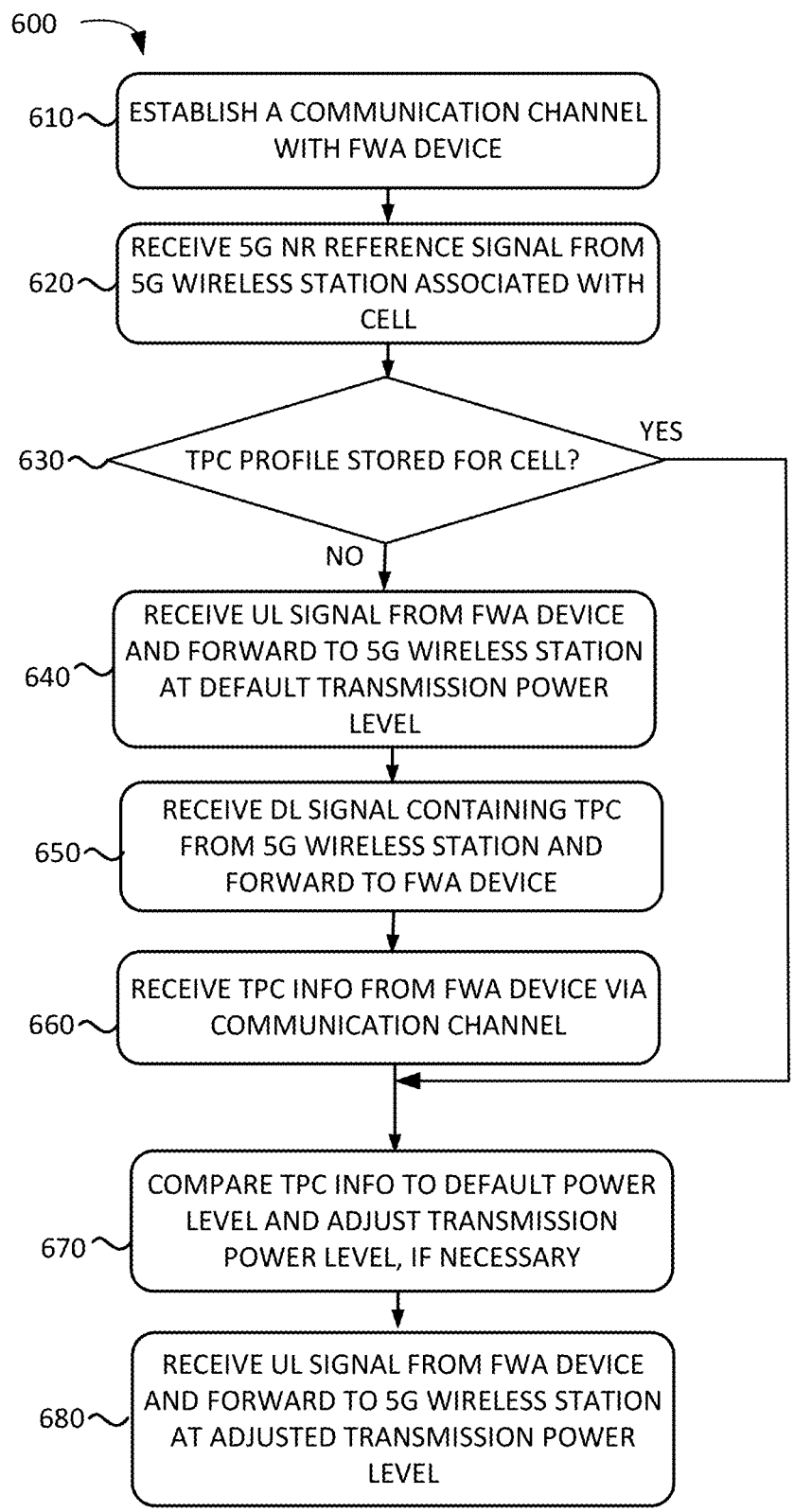
FIG. 6 is a flowchart of a process for controlling transmission power levels according to an implementation described herein.

FIG. 6 is a flowchart of a process 600 for dynamically controlling an uplink transmission power level according to an implementation described herein. In some implementations, process 600 may be performed by repeater device 125. In other implementations, some or all of process 600 may be performed by another device or a group of devices separate from repeater device 125.

Process 600 may include establishing a communication channel with an FWA device associated with CPE network 110 (block 610). For example, FWA device 120 and repeater device 125 may be paired via a WiFi or Bluetooth® connection and repeater device 125 may receive an identifier associated with FWA device 120 via connection 126. The identifier may include a Media Access Control (MAC) address, and/or another type of identifier that may be used by repeater device 125 to identify and establish communication with FWA device 120. Once FWA device 120 and repeater device 125 are paired, repeater device 125 may communicate with FWA device 120 via short-range antenna 250.

A scan may be performed for 5G NR reference signals via cell 150 (block 620) and wireless station 160 may be identified. Process 600 may include repeater device 125 determining whether a TPC profile is stored for identified cell 150 (block 630). For example, repeater device 125 may determine whether TPC 515 includes an indication "yes" (e.g., value=1) or an indication "no" (e.g., value=0). If repeater device 125 determines that a TPC profile is stored for cell 150 (block 630—YES), process 600 may continue at block 670.

If repeater device 125 determines that a TPC profile is not stored for cell 150 (block 630—NO), repeater device 125 may receive an uplink signal from FWA device 120 destined for 5G wireless station 160 and forward the signal at a default transmission level (block 640). In some embodiments the default transmission may correspond to a maximum amplified gain, for example. Process 600 may include repeater device 125 receiving a downlink signal that carries TPC command data from 5G wireless station 160 and provide the downlink signal to FWA device 120 (block 650). In response, repeater device 125 may receive TPC command information from FWA device 120 (670).

In some embodiments, repeater device 125 may compare the TPC command information to the default transmission power level or range value, and adjust the transmission power level settings based on results of the comparison (block 670). In other embodiments, a similar comparison will be made of the TPC command information to the TPC profile transmission power level or range value from block 630. Process may conclude with repeater device 125 receiving an uplink signal from FWA device 120 and forwarding the signal to 5G wireless station 160 using the adjusted transmission power level or range values (block 680).

Figure 7:
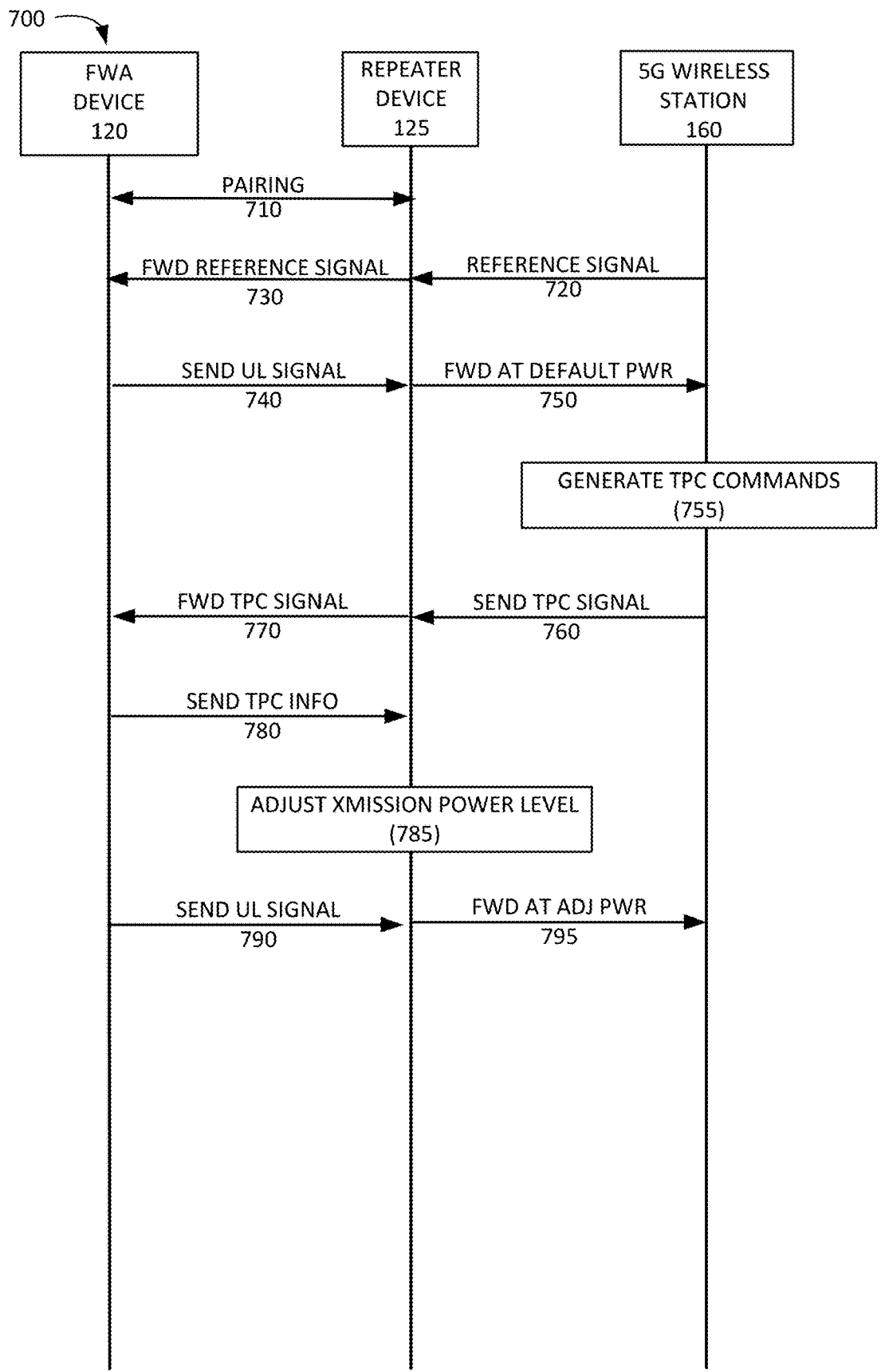
FIG. 7 is a diagram of an exemplary signal flow according to an implementation described herein.

FIG. 7 is a diagram of an exemplary signal flow 700 according to an implementation described herein. As shown in FIG. 7, signal flow 700 may include a pairing process between repeater device 125 and FWA device 120 (signal 710). For example, FWA device 120 and repeater device 125 may be paired via a WiFi or Bluetooth® connection 126 and repeater device 125 may receive an identifier associated with FWA device 120 via the connection. 5G wireless station 160 may transmit 5G SSB signals (signal 720) for cell 150. Repeater device 125 may forward the 5G SSB signals (signal 730) to FWA device 120.

FWA device 120 may send an uplink signal to 5G wireless station 160 via repeater device 125 (signal 740). Repeater device 125 may forward the uplink signal to 5G wireless station 160 at a default transmission power level (signal 750). In some embodiments, the default power will be at a maximum value, for example, of amplified gain. 5G wireless station 160 may receive the uplink signal and, based on the measured signal strength and/or signal quality (e.g., based on an RSRP value, SINR value, BLER value, etc.), calculate uplink TPC command parameters (block 755).

5G wireless station 160 may send a message carrying the TPC command parameters to FWA device 120 via repeater device 125 (signal 760). Repeater device 125 may forward the signal carrying the message to FWA device 120 (signal 770). FWA device 120 may generate and send a message carrying TPC parameter values to repeater device 125 via connection 126 (signal 780). Repeater device 125 may examine the message and adjust the uplink transmission power level values (e.g., amplified gain) for messages destined for 5G wireless station 160 (block 785). FWA device 125 may transmit an uplink signal to wireless station 160 via repeater device 125 (signal 790). Repeater device 125 may receive, amplify, and transmit the amplified uplink signal via cell 150 using the adjusted uplink transmission power level (signal 795).

According to some embodiments, the adjusted uplink transmission power levels may substantially correspond to calculated and/or measured path loss corresponding to a physical and/or logical distance from a location of repeater device 125 to 5G wireless station 160. Referring to FIG. 1, for simplicity, the relative distances of 5G wireless stations 160-1, 160-2, 160-3, and 160-x from repeater device 125 may result in path loss corresponding to adjusted uplink transmission power levels in which the largest amplified gain, for example, is used for uplink transmissions to 5G wireless station 160-x, the next largest amplified gain is used for uplink messages to 5G wireless station 160-2, the next largest amplified gain is used for transmissions to 5G wireless station 160-3, and the least amplified gain is used for uplink transmissions to 5G wireless station 160-1. In other embodiments, the uplink transmission power levels may be determined based on factors other than relative distances from respective 5G wireless stations 160.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signal flows has been described with respect to FIG. 7, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a repeater device, first reference signals from a first wireless station;
   forwarding, by the repeater device, the first reference signals to a fixed wireless access (FWA) device;
   transmitting, by the repeater device at a first gain value, a first uplink signal received from the FWA device to the first wireless station, wherein the first gain value comprises a maximum gain value associated with the repeater device;
   receiving, by the repeater device and in response to the first uplink signal, first transmit power control (TPC) command parameters from the FWA device; and
   adjusting, by the repeater device and based on the first TPC command parameters, the first gain value to an adjusted gain value, wherein the adjusted gain value is less than the maximum gain value.

2. The method of claim 1, further comprising:
   receiving second reference signals from a second wireless station;
   determining, using stored second TPC command information associated with the second wireless station, a second gain value; and
   transmit, at the second gain value, a second uplink signal received from the FWA device to the second wireless station.

3. The method of claim 2, wherein the second gain value is greater than the first gain value, and wherein a distance of the repeater device to the second wireless station is greater than a distance of the repeater device to the first wireless station.

4. The method of claim 1, further comprising determining the first TPC command parameters based on at least one of:
   a Reference Signal Received Power (RSRP) value,
   a Reference Signal Received Quality (RSRQ) value, or
   a Received Signal Strength Indication (RSSI) value.

5. The method of claim 1, wherein the first TPC command parameters are based on at least one of a location of the repeater device within a coverage area serviced by the first wireless station or an object located between the repeater device and the first wireless station.

6. The method of claim 1, further comprising determining the first TPC command parameters based on at least one of:
   a signal-to-interference-plus-noise ratio (SINR) value,
   a signal to noise ratio (SNR) value,
   a block error rate (BLER) value,
   an amplifier gain setting value, or
   a channel state information (CSI) value.

7. The method of claim 1, further comprising:
   generating, based on the first TPC command parameters, a gain value profile for the first wireless station; and
   transmitting, using the gain value profile, a second uplink signal from a second FWA device to the first wireless station at a second gain value.

8. A repeater device comprising:
   a processor configured to:
      receive first reference signals from a first wireless station;
      forward the first reference signals to a fixed wireless access (FWA) device;
      transmit, at a first gain value, a first uplink signal received from the FWA device to the first wireless station;
      receive, in response to the first uplink signal, first transmit power control (TPC) command parameters from the FWA device;
      adjust, based on the first TPC command parameters, the first gain value to an adjusted gain value;
      generate, based on the first TPC command parameters, a gain value profile for the first wireless station; and transmit, using the gain value profile, a second uplink signal received from a second FWA device to the first wireless station at a second gain value.

9. The repeater device of claim 8, wherein the processor is further configured to:
receive second reference signals from a second wireless station;
determine, using stored second TPC command information associated with the second wireless station, a third gain value; and
transmit, at the third gain value, a third uplink signal received from the FWA device to the second wireless station.

10. The repeater device of claim 9, wherein a difference between the third gain value and the first gain value corresponds to a difference between a first path loss incurred over a distance of the repeater device to the second wireless station and a second path loss incurred over a distance of the repeater device to the first wireless station.

11. The repeater device of claim 8, wherein the first gain value comprises a maximum gain value associated with the repeater device, and wherein the adjusted gain value is less than the maximum gain value.

12. The repeater device of claim 8, wherein the first TPC command parameters are based on at least one of a location of the repeater device within a coverage area serviced by the first wireless station or a location of an object between the repeater device and the first wireless station.

13. The repeater device of claim 8, wherein a determination of the first TPC command parameters is based on at least one of:
a signal-to-interference-plus-noise ratio (SINR) value,
a signal to noise ratio (SNR) value,
a block error rate (BLER) value,
an amplifier gain setting value, or
a channel state information (CSI) value.

14. The repeater device of claim 8, wherein the processor is further configured to determine the first TPC command parameters based on:
a Reference Signal Received Power (RSRP) value,
a Reference Signal Received Quality (RSRQ) value, or
a Received Signal Strength Indication (RSSI) value.

15. A non-transitory computer-readable medium including instructions that, when executed by a processor of a repeater device, cause the repeater device to:
receive first reference signals from a first wireless station;
forward the first reference signals to a fixed wireless access (FWA) device;
transmit, at a first gain value, a first uplink signal received from the FWA device to the first wireless station;
receive, in response to the first uplink signal, first transmit power control (TPC) command parameters from the FWA device, wherein the first TPC command parameters correspond to at least one of a location of the repeater device within a coverage area serviced by the first wireless station or a location of an object between the repeater device and the first wireless station; and
adjust, based on the first TPC command parameters, the first gain value to an adjusted gain value.

16. The non-transitory computer-readable medium of claim 15, further including instructions that, when executed by the processor cause the repeater device to:
receive second reference signals from a second wireless station;
determine, using stored second TPC command information associated with the second wireless station, a second gain value; and
transmit, at the second gain value, a second uplink signal received from the FWA device to the second wireless station.

17. The non-transitory computer-readable medium of claim 16, wherein a difference between the second gain value and the first gain value corresponds to a difference between a distance of the repeater device to the second wireless station and a distance of the repeater device to the first wireless station.

18. The non-transitory computer-readable medium of claim 15, wherein the first gain value comprises a maximum gain value associated with the repeater device, and wherein the adjusted gain value is less than the maximum gain value.

19. The non-transitory computer-readable medium of claim 15, wherein the first TPC command parameters correspond to are determined based on at least one of:
a Reference Signal Received Power (RSRP) value,
a Reference Signal Received Quality (RSRQ) value, or
a Received Signal Strength Indication (RSSI) value.

20. The non-transitory computer-readable medium of claim 15, wherein the first TPC command parameters are determined based on at least one of:
a signal-to-interference-plus-noise ratio (SINR) value,
a signal to noise ratio (SNR) value,
a block error rate (BLER) value,
an amplifier gain setting value, or
a channel state information (CSI) value.

* * * * *